United States Patent [19]
Stoll

[11] 3,796,190
[45] Mar. 12, 1974

[54] HOG FEEDER

[76] Inventor: Howard B. Stoll, c/o George Spector, 3615 Woolworth Bldg., 233 Broadway, New York, N.Y. 10007

[22] Filed: May 25, 1972

[21] Appl. No.: 256,795

[52] U.S. Cl. .................................................. 119/63
[51] Int. Cl. ............................................. A01k 5/00
[58] Field of Search .......... 119/18, 51, 51.5, 61, 63, 119/65, 68, 69

[56] References Cited
UNITED STATES PATENTS

| 33,216 | 9/1861 | Staehlen | 119/18 X |
| 2,419,834 | 4/1947 | Grindstaff | 119/51.5 |
| 3,185,133 | 5/1965 | Bird | 119/18 |
| 2,122,591 | 7/1938 | Smrekar, Sr. | 119/61 |
| 3,114,350 | 12/1963 | King et al. | 119/61 X |
| 3,320,930 | 5/1967 | Pockman et al. | 119/18 |

*Primary Examiner*—Louis G. Mancene

[57] ABSTRACT

A feeder for use to feed hogs, the feeder having the distinct feature of preventing the hogs to root the feed out; the feeder consisting of a singular part that is cut out from a length of cylindrical steep pipe and in which a deep notch is provided from one end so to give access for the hog to reach the feed.

1 Claim, 4 Drawing Figures

PATENTED MAR 12 1974  3,796,190
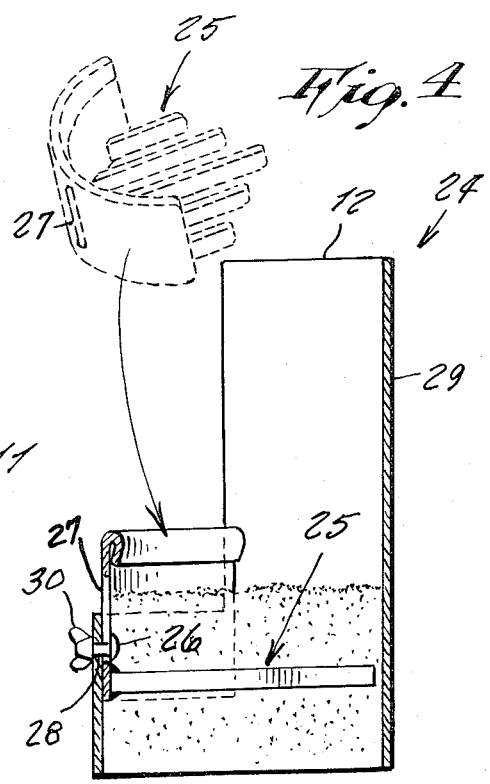
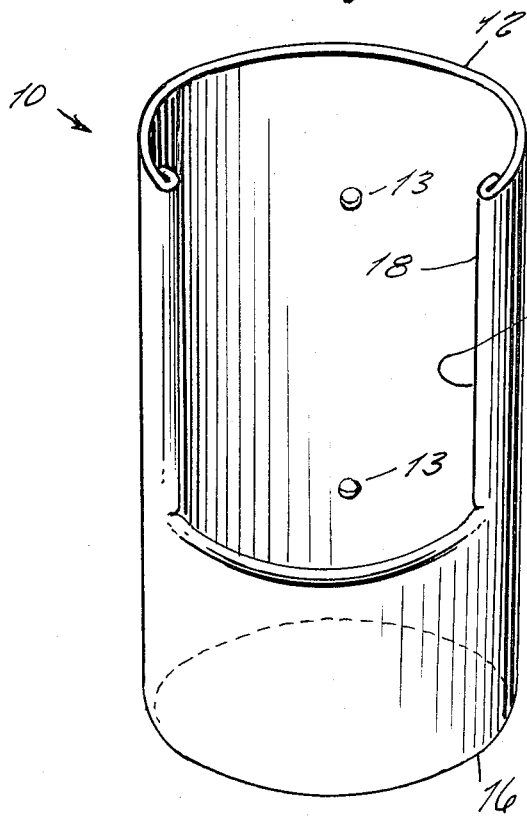
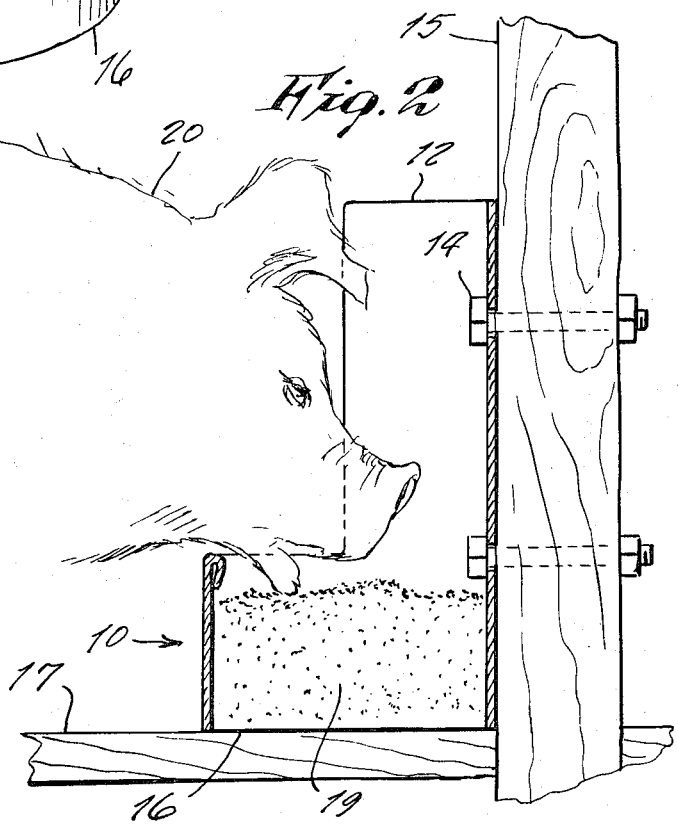
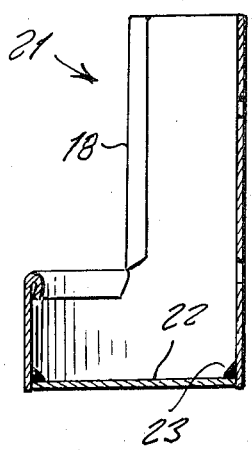

HOG FEEDER

This invention relates generally to animal feeders. More specifically it relates to feeders for hogs.

A principal object of the present invention is to provide a feeder which has definite advantages over the conventional feeders made of wood and which are presently being marketed.

Another object is to provide a hog feeder having the advantage that hogs cannot root the feed out of the feeder.

Another object is to provide a hog feeder that is comprised of a one piece member made from cylindrical pipe so that there is no assembly problem in its manufacture.

Another object is to provide a hog feeder which, being round, prevents hogs to push on it.

Other objects are to provide a HOG FEEDER which is simple in design, inexpensive to manufacture, rugged in construction, easy to use and efficient in operation.

These and other objects will be readily apparent upon a study of the following specification and the accompanying drawing wherein:

FIG. 1 is a perspective view of the invention.

FIG. 2 is a cross sectional view thereof shown in use.

FIG. 3 is a similar view of a modified design of the invention which includes a bottom.

FIG. 4 is a similar view of another modified design which includes a vertically adjustable front plate so to allow the feeder to hold more feed, and wherein a grate secured to the plate controls the amount of feed permitted to the stock; the plate being able to be lowered to allow access of the stock to get to the lower feed.

Referring now to the drawing in detail, and more particularly at this time to FIGS. 1 and 2, the reference numeral 10 represents a hog feeder according to the present invention wherein there is a one piece member, made from a one-eight inch thick steel pipe material that is rolled up into a twelve inch diameter pipe. The pipe is cut into a 20 inches length and a notch 11 is cut down from a top end edge 12. The notch is 10 inches wide and 13 inches deep. A pair of holes 13 on an opposite side serves to receive mounting bolts 14 so to secure the feeder to a post 15 of a barn. The bottom edge 16 rests directly upon a concrete or wood floor 17 so that no bottom has to be built to the feeder. THe edges 18 of the noth can be rolled over as shown so to be smooth.

In use, feed 19 is placed in the feeder and hog 20 cannot root it out.

If the feeder is intended for use over a dirt floor, then the feeder 21 shown in FIG. 3 must be used. Feeder 21 includes a bottom wall 22 made of circular steel plate and is spot welded to the cylindrical member as shown at 23.

In FIG. 4, the feeder 24 includes a separate grate 25 that is seated inside the feeder and is vertically adjustable by a screw 26 passed through slot 27 of the grate and opening 28 of the cylinder member 29. A wing nut 30 secures the screw. The grate con trols the amount of feeding available to the hog.

While various changes may be made in the detail construction, it is understood that such changes will be within the spirit and scope of the present invention.

I claim as follows:

1. In a hog feeder the combination of a cylindrical pipe member having parallel upper and lower edges, a notch extending downward from said upper edge for providing access for a hog to feed within said pipe member, and a mounting opening on a side diagonally opposite of said notch, a circular bottom wall secured to said lower edge, a vertically adjustable grate fitted in a substantially horizontally extending position across the transverse extent of said pipe member below said notch and secured in selected position by a screw fitted through a slot and opening of said pipe member and grate respectively.

* * * * *